(12) United States Patent
Baer (10) Patent No.: US 10,904,893 B2
(45) Date of Patent: Jan. 26, 2021

(54) METHODS AND APPARATUSES FOR QUALITY OF SERVICE ASSESSMENT IN A NETWORK

(71) Applicant: Telia Company AB, Solna (SE)

(72) Inventor: Anders Baer, Arsta (SE)

(73) Assignee: Telia Company AB, Solna (SE)

(*) Notice: Subject to any disclaimer, the term of this patent is extended or adjusted under 35 U.S.C. 154(b) by 0 days.

(21) Appl. No.: 16/137,217

(22) Filed: Sep. 20, 2018

(65) Prior Publication Data
US 2019/0098642 A1 Mar. 28, 2019

(30) Foreign Application Priority Data
Sep. 27, 2017 (SE) ...................................... 1751198

(51) Int. Cl.
*H04W 72/08* (2009.01)
*H04W 48/20* (2009.01)
*H04W 48/14* (2009.01)
*H04B 17/382* (2015.01)
*H04B 17/309* (2015.01)

(52) U.S. Cl.
CPC ........ *H04W 72/087* (2013.01); *H04B 17/309* (2015.01); *H04B 17/382* (2015.01); *H04W 48/14* (2013.01); *H04W 48/20* (2013.01)

(58) Field of Classification Search
CPC .............................. H04W 48/14; H04W 48/20
USPC ........................................................ 370/329
See application file for complete search history.

(56) References Cited

U.S. PATENT DOCUMENTS

2006/0221903 A1 10/2006 Kauranen et al.
2009/0005054 A1* 1/2009 Moritomo ......... H04W 72/0486
455/450
2009/0109977 A1 4/2009 Valluru
(Continued)

FOREIGN PATENT DOCUMENTS

WO 2016096625 A1 6/2016

OTHER PUBLICATIONS

Swedish Search Report, App. No. 1751198-1, dated May 25, 2018, pp. 1-2, Swedish Patent and Registration Office, Stockholm, Sweden, Alma Kesan.
(Continued)

*Primary Examiner* — Angel T Brockman
(74) *Attorney, Agent, or Firm* — Burr & Forman LLP; Jeffrey H. Kamenetsky (57) ABSTRACT

The embodiments herein relate to methods, an access point and a network node for service quality assessment in a network environment. According to a method, the access point receives, from a user equipment, a request for a service; and determines a service quality identifier based on the requested service. The access point sends, to a network node of a service provider, the service request including the service quality identifier. The network node analyzes the received service quality identifier for determining whether or not the requested service can be supported. If the requested service can be supported, the network node transmits a response to the user equipment informing that the service can be supported over the access point. If the requested service cannot be supported, the network node transmits a response to the user equipment instructing the user or the user equipment to select another access point.

15 Claims, 9 Drawing Sheets

(56) References Cited

U.S. PATENT DOCUMENTS

2009/0129338 A1* 5/2009 Horn ................ H04W 36/0007
370/331
2014/0036696 A1 2/2014 Lee Jung Gun et al.
2014/0092723 A1* 4/2014 Murphy ................ H04L 69/03
370/221

OTHER PUBLICATIONS

Result of Consulation, May 28, 2020, issued from the European Patent Office for European Application No. 18 195 676.4-1215.
Office Action, dated May 18, 2020, issued from the European Patent Office for European Application No. 18 195 676.4-1215.

* cited by examiner

METHODS AND APPARATUSES FOR QUALITY OF SERVICE ASSESSMENT IN A NETWORK

TECHNICAL FIELD

The present disclosure relates to the field of wireless communications, and in particular to methods and apparatuses for assessing quality of service of a requested service in a network.

BACKGROUND

Reliable network performance has long been an important factor for many network applications. However, with an increasing amount of services such as audio and video being sent over networks, the ability to provide quality of service (QoS) guarantees may be more important in today's networks than it ever was. Therefore, a great deal of effort has been applied to the task of finding ways to provide reliable network performance while at the same time utilizing the total network resources in an efficient manner. QoS techniques required for wireless networks completely differ than for wired networks.

Also, advancement in communication technology has made it possible for a user to avail services like mobile TV, E-commerce, video calling, online gaming, multimedia applications, and the like, provided by a service provider over a communication network. Implementation of high speed network technologies has made it possible for service providers to offer such services to the user. The user, through various communication devices, such as laptops, computers, desktops, smart phones, PDA's, and the like, may enjoy the services offered by the service provider over one or more communication networks, such as Ethernet, wireless local area network (WLAN), local area network (LAN), and other similar networks. Such services provided by the service provider usually involve real-time data transfer over the communication network and may thus require high bandwidth for their entire duration of operation to ensure smooth operation.

Some applications and services however are delay sensitive and thus require certain minimum connection speed in order to function efficiently. For example, certain applications like on-line gaming over the web are sensitive to network connection and require continuous connectivity to the network. To ensure that satisfactory services are provided to the user, the service provider adopts several measures to provide reasonable QoS to the user, i.e., best effort.

However, variation in best effort networks could allow a service that requires constant quality to be using a network offering less quality but this can only be noticed when the service is being consumed and therefore it may be too late for a service provider to improve the quality in such a network. This will result in that the user perception is not sufficient/satisfactory. This is cumbersome for the service operator.

One approach would be to restrict access to unknown networks or to require control of such networks to not jeopardize the quality of the offered service. This approach is not desirable because in certain access environments, the service may not be offered at all just because of the "unknown" access quality that might apply leaving the user with no services in such an environment.

There is therefore a need for a new solution that solves the above problems.

SUMMARY

It is an object of embodiments herein to solve the above problems by providing methods, and apparatuses for assessing the quality of service of a requested service in a network.

According to an aspect of embodiments herein, there is provided a method for quality of service assessment, the method comprising: an access point receiving, from a user equipment (UE), a request for a service; the access point determining a service quality identifier based on the requested service; and the access point sending, to a network node of a service provider, the service request including the service quality identifier. The network node analyzes the received service quality identifier for determining whether or not the requested service can be supported. If the service can be supported, the network node transmits a response to the UE informing that the service can be supported over the access point. If the requested service cannot be supported, the network node transmits, to the UE, a response instructing the UE to select another access point.

According to another aspect of embodiments herein, there is provided an access point for quality of service assessment in a network environment, the access point comprises a processor and a memory containing instructions executable by the processor whereby the access point is operative to: receive, from a UE, a request for a service; determine a service quality identifier based on the requested service; send, to a network node of a service provider, the service request including the service request identifier, for analysis by the network node, and enable a service connection for the requested service to be established between the UE and the service provider when the requested service can by supported by the access point.

There is also provided a method performed by the access point.

According to another aspect of embodiments herein, there is provided a network node of a service provider for quality of service assessment in a network environment, the network node comprises a processor and a memory containing instructions executable by the processor whereby the network node is operative: to receive, from an access point, a service request including a service quality identifier for the requested service; and analyze the received service quality identifier for determining whether or not the requested service can be supported. If the requested service can be supported, the network node is operable to transmit a response to a UE requesting the service, that the service can be supported over the access point. If the requested service cannot be supported, the network node is operative to transmit a response to the UE instructing the UE to select another access point.

There is also provided a method performed by the network node.

An advantage with embodiments herein is to provide the UE the requested service with a reasonable quality of service.

Additional advantages achieved by the present disclosure will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1:
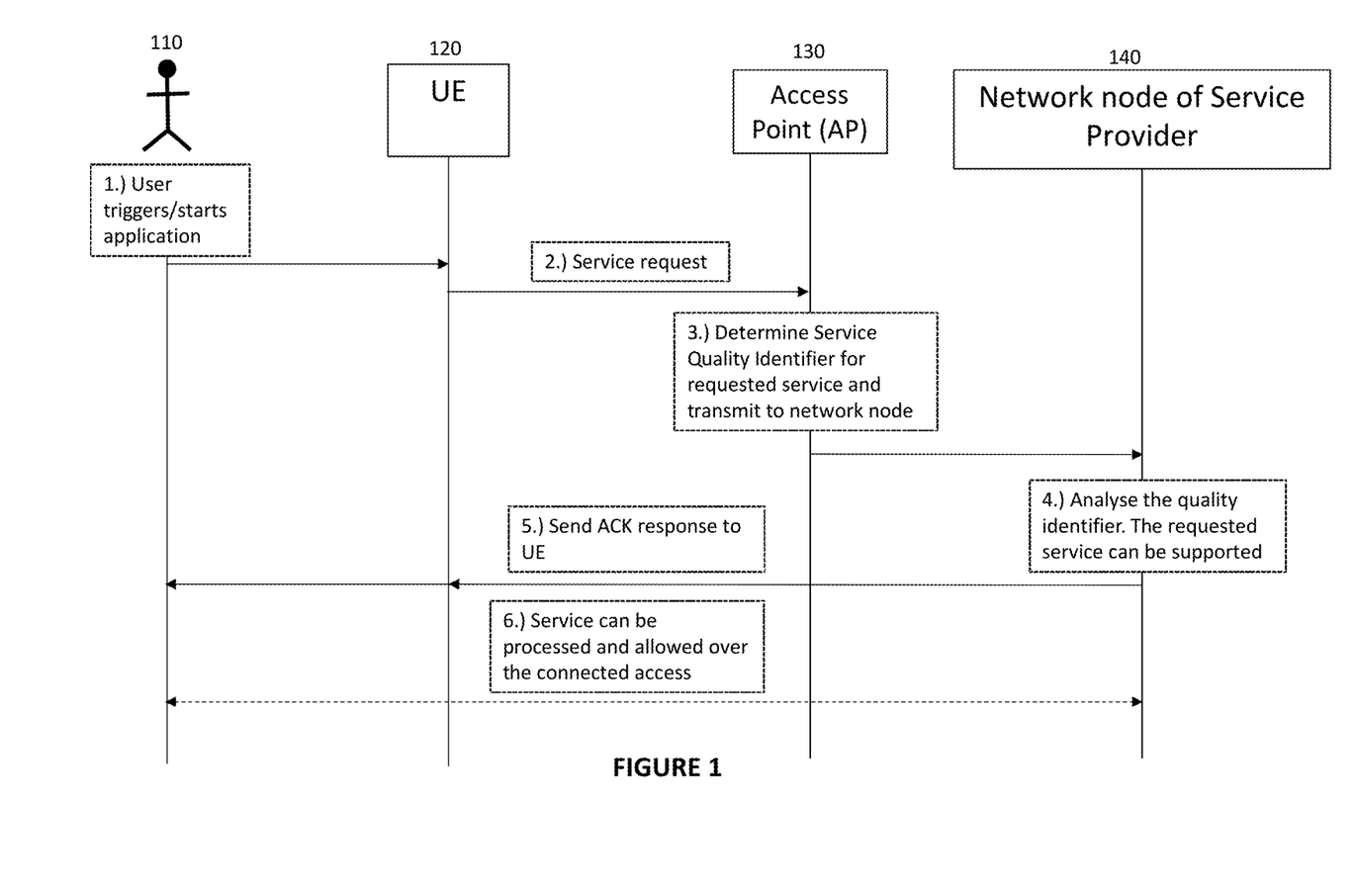
FIG. 1 illustrates a procedure for requesting a service with service quality fulfilment according to an exemplary embodiment herein.

Referring to FIG. 1, there is illustrated a procedure for requesting a service with service quality fulfilment according to an exemplary embodiment herein.

The present disclosure addresses the need to provide, to a mobile terminal or a UE, a service having service quality requirements that need to be fulfilled for it to work. An example of such as a service is a real-time service such as a WiFi-calling or online-gaming.

As an example, a user 110 starts or triggers (1) an application on his/her user equipment 120, e.g., a mobile terminal or a smartphone device for initiating a call (service), e.g., a call via application Viber™ or via Skype™ over the WiFi network. It should be noted that any service or application can be considered and the embodiments herein are not restricted to any specific service or application nor it is restricted to any specific port number.

As shown in FIG. 1, a service request is sent (2) from the UE 120 to an access point (AP) 130 of the WiFi network. According to an embodiment of the present disclosure, the AP 130 is configured to determine (3) a service quality identifier based on the requested service. The AP may determine if the requested service matches the set service profile. For example, the AP 130 maps the requirements of the requested service in terms of at least: required bandwidth, (max) latency and (max) packet loss to the available bandwidth, latency and packet loss that the AP can support for the requested service, and selects a service quality identifier from a set of service quality identifiers on the basis of the mapping.

Below is a table showing examples of quality identifiers and service profiles for three different services denoted Service X, Service Y and Service Z.

TABLE 1

| | Quality identifiers and service profiles | | | | | |
|---|---|---|---|---|---|---|
| Service Id | Ports | Protocol | Required bandwidth | Required max Latency | Maximum packet loss | Minimum Quality Identifier |
| Service X | 1023 | udp | 1000 kb/s | 100 ms | 5.5% | 50 |
| Service Y | 1024, 1031 | tcp | 500 kb/s | 150 ms | 4% | 33 |
| Service Z | 1109, 1528 | udp | 100 kb/s | 50 ms | 1% | 62 |

In the example shown in Table 1, the service requirements for "Service X" include: a required bandwidth of 1000 kb/s, a required max latency of 100 ms and a maximum packet loss is 5.5%. For "Service Y", the required bandwidth is 500 kb/s; the required max latency is 150 ms and the maximum packet loss is 4%. The requirements for "Service Z" are also listed.

Based on these service requirements, the minimum service quality identifier is determined. As shown, the minimum service quality identifier for Service X is 50; for Service Y, 33 and for Service Z, 62. The quality identifier may be viewed as a weighted number that represents a quality value to be met for the service of interest. The minimum quality identifier may be determined using an algorithm taking into consideration at least the requirements of the service. Additional parameters may also be included in the algorithm, e.g., the number of UEs connected to an AP at a certain time etc.

The ports and the protocol that may be used for each of the services are also indicated in the table. It should be mentioned that the port numbers are only examples of ports that may be used for respective service or application. The embodiments herein are not restricted to the examples shown in Table 1.

Assuming that the requested Service X is the WiFi-call, the AP 130 may determine (or calculate), using the service requirements of Service X, from the table above, that the (minimum) service quality identifier for supporting the requested service is 50.

As depicted in FIG. 1, AP 130 transmits (3) the quality identifier together with the request to a network node 140 of the service provider. When the network node 140 receives the request including the quality identifier, the network node 140 will decide whether or not the requested service can be supported by the AP 130, i.e., it will analyze (4) the quality identifier to determine whether or not the AP 130 has sufficient resources to support the requested service. Analysis of the quality identifier may be based on an agreement between the owner of the AP and the service provider of what the service quality identifier is representing so that each level of the quality identifier is a representation of the characteristics of the service that can be offered at the point time when the request is received at the service provider 140. The service provider may predetermine the quality identifier for each service or application and then analyze the information received from the AP (i.e., the request including the service quality identifier that can be offered by the AP for a given service) and compare the received quality identifier with the predetermined quality identifier to determine whether or not the requested service can be supported by the AP.

If the requested service can be supported, i.e., the service grade or level can be met, the network node 140 of the service provider transmits (5) a positive acknowledgment (ACK) response to the UE 120 informing that the service can be supported over AP 130. The service connection can be established and processed (6) between the UE 120 and the network node 140 to start using the requested service over AP 130. The user 110 can now start to consume the requested service over the connected access. An advantage of including the quality identifier in the service request each time a service is requested is to allow the service provider to dynamically update the policy for the access networks that are to be treated as qualified or allowed to serve the users with the requested service.

The network node 140 may include the identity of the AP 130, e.g., the SSID (service set identifier), the HESSID (homogeneous extended SSID) or equivalent AP identifier in a list of approved networks. Hence, the next time the same AP sends the service request to the network node, the network node checks if the AP is in the list of approved access networks and that being the case, the network node may determine that the requested service can be supported with the required quality. Note that the service request may also include the access point identity SSID or the HESSID in addition to the service quality identifier for enabling the network node 140 of the service provider to quickly check if the AP sending the request is an approved AP.

As previously explained, the service quality identifier being a numeric value (e.g., 1-1000) represents the ability of the AP to offer a constant quality. Having the quality identifier in a simplified format allows access networks (e.g., WiFi networks) to reveal information about quality to a service provider without stating the exact performance of the network.

As described before, the service quality identifier may be calculated or determined by a measurement algorithm over a defined historical time span, e.g., the last 5 min and takes into account quality parameters (requirements) as explained before, which include the bandwidth or percentage of throughput per time, latency (round-trip-time, one-way, etc.) and packet loss per service, the number of connected UEs and consumed bandwidth per UE.

As mentioned before, determination of the service quality identifier may include mapping the requirements of the requested service in terms of: required bandwidth, latency and packet loss, to the available capacity or available bandwidth, latency and packet loss that the access point can support for the requested service. The service quality identifier may then be selected from a set of service quality identifiers on the basis of said mapping Below is a table showing an example of service quality identifiers that AP 130 may offer for a requested service.

TABLE 2

Calculated Quality identifier per capacity resource

| Time | Average avail. Bandwidth | Average avail. throughput | Average latency | Average packet loss | Offered Quality Identifier (#1-1000) |
|---|---|---|---|---|---|
| 10:05:00 | 6 MB/s | 50% | 85 ms | 2% | 65 |
| 10:05:30 | 2 MB/s | 15% | 100 ms | 2% | 22 |
| 10:06:00 | 5 MB/s | 45% | 110 ms | 3% | 43 |

As shown in Table 2, the quality identifier of a service may vary with time depending on different key attributes such as the average available bandwidth supported by the AP; the average available throughput, the average latency and the average packet loss. Hence, the available capacity that the AP is capable of supporting may be determined or calculated by constant measurement of the key attributes that affect the requested service.

As an example, assume that, for service X, a pre-set quality identifier predetermined by a service provider is of value 50, and the calculated or determined quality identifier that an AP can offer for the same service X is 40, which is communicated to the service provider. The service provider will then analyze this received value and determine that it is not enough for the requested service. The service provider will then inform the UE to select another access network for the requested service.

As previously described, an AP could also have a more granular level of quality identifiers associated to each service if the service is configured in advance (locally or remotely) stating what preferences a service needs to meet for the desired service level. Those preferences may be translated to a minimum quality identifier (see Table 1 above) that an AP can offer for the specific service. It should be mentioned that an AP may take a decision if a service can be supported or not. If it cannot support the service, the AP may inform devices or UEs connected to it that, for that specific service, another access point should be selected.

However, since the service provider is in a contractual agreement with its subscribers, the service provider should decide and inform its subscriber(s) when a new AP should be tried on the basis of the quality identifier received from the AP.

Figure 2:
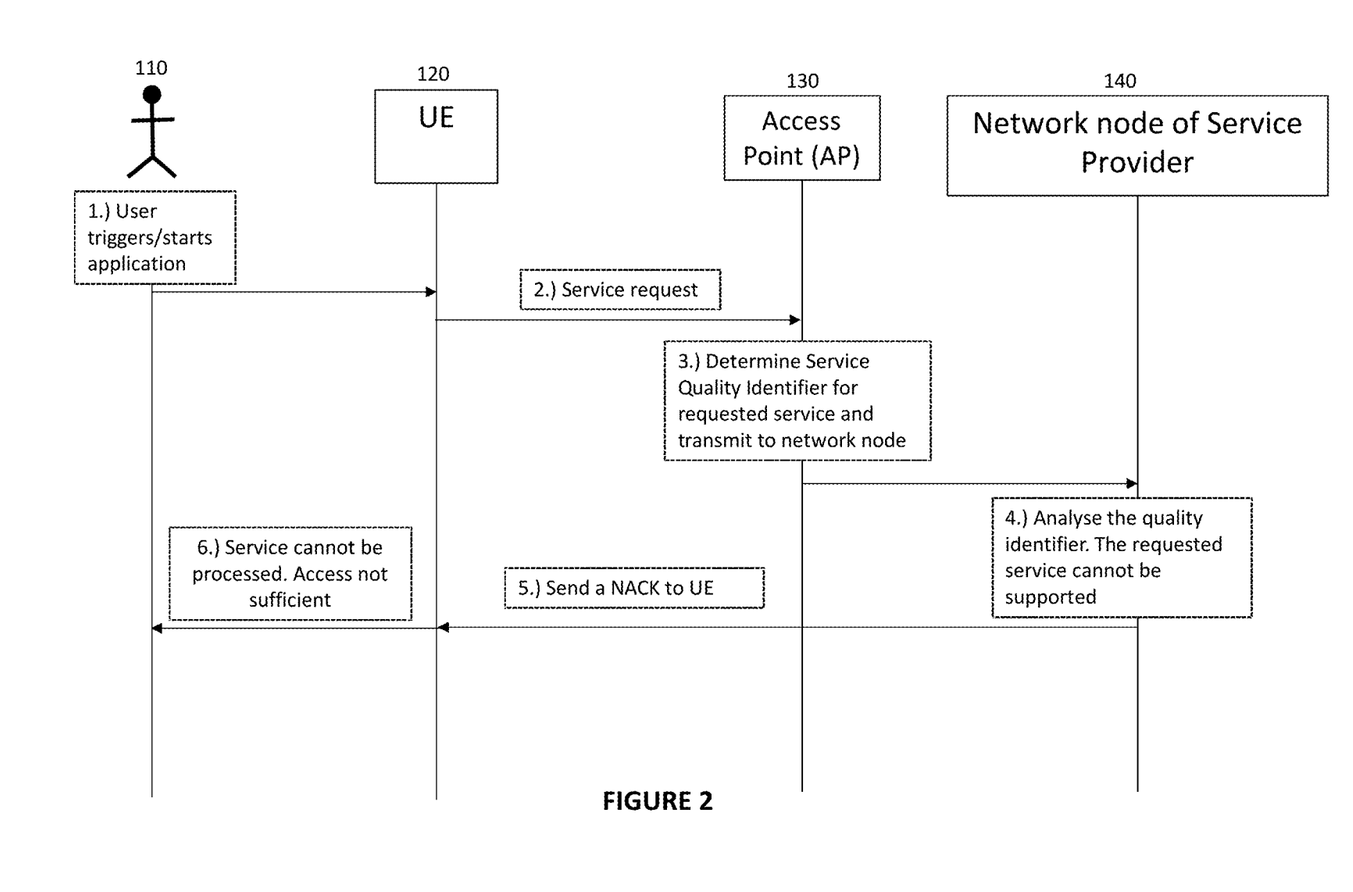
FIG. 2 illustrates a procedure for requesting a service with service quality non-fulfilment according to an exemplary embodiment herein.

Referring to FIG. 2, there is illustrated a procedure for requesting a service with service quality non-fulfilment according to an exemplary embodiment herein. Hence, in this scenario, the network node 140 of the service provider decides to reject the request from AP 130 since the service grade cannot be met and AP 130 cannot support the service. As shown, actions 1, 2 and 3 are similar to those of FIG. 1 and need not be repeated again.

In action (4), the network node 140 after analysis of the service quality identifier, decides that the service grade cannot be supported/met. The network node 140 transmits a response to the user or UE 120 with a negative acknowledgment (NACK) (5) instructing the UE 120 to select another AP. A message may be displayed to the user indicating that the requested service cannot be processed (6) since access is not sufficient. The user 110 of mobile terminal or UE 120 may then select another AP, if available, and repeat the procedure above for requesting the service.

The network node 140 of the service provider may store the SSID or HESSID of the AP 130 in a list of APs that cannot support the requested service. The time stamp can also be stored together with the service quality identifier determined by AP 130.

Figure 3:
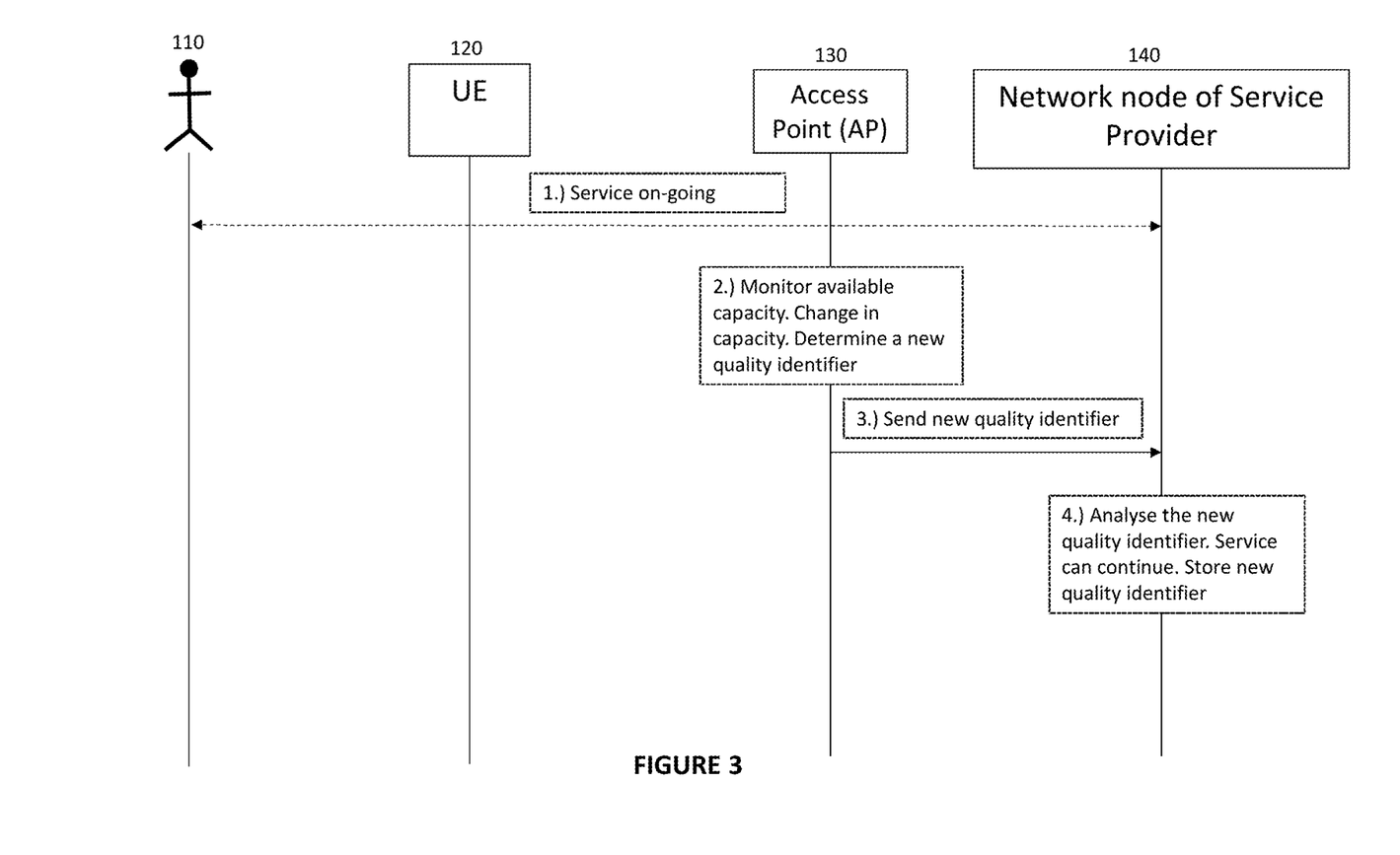
FIG. 3 illustrates a procedure wherein the service quality identifier is changed during use of the service when the service grade is met according to an embodiment herein.

Referring to FIG. 3, there is illustrated a procedure wherein the service quality identifier is changed during use of the service, according to an embodiment herein.

In this scenario, the service between the user 110 (or UE 120) and the network node 140 of the service provider is considered established (1) i.e., on-going use of the service over AP 130. In other words, this scenario follows the procedure of FIG. 1 where the network node 140 decided that AP 130 can support the requested service.

AP 130 is configured to monitor its available capacity (2) and to determine if there is a change in the available capacity. The change may be due to increased traffic, dropped packets, etc. A change may also occur if the traffic decreases or the packet loss decreases, etc.

If a change occurs, the AP 130 determines or calculates a new service quality identifier that can be offered and sends (3) the new service quality identifier to the network node 140. The network node 140 receiving this information from AP 130 will analyze (4) the new quality identifier and if the network 140 decides that the new quality identifier fulfills the requirements of the on-going use of the service, i.e., the service grade can still be met/supported and the service can continue, the network node 140 stores the new quality identifier. The service can continue and there is no need for the network node 140 to inform the user.

Figure 4:
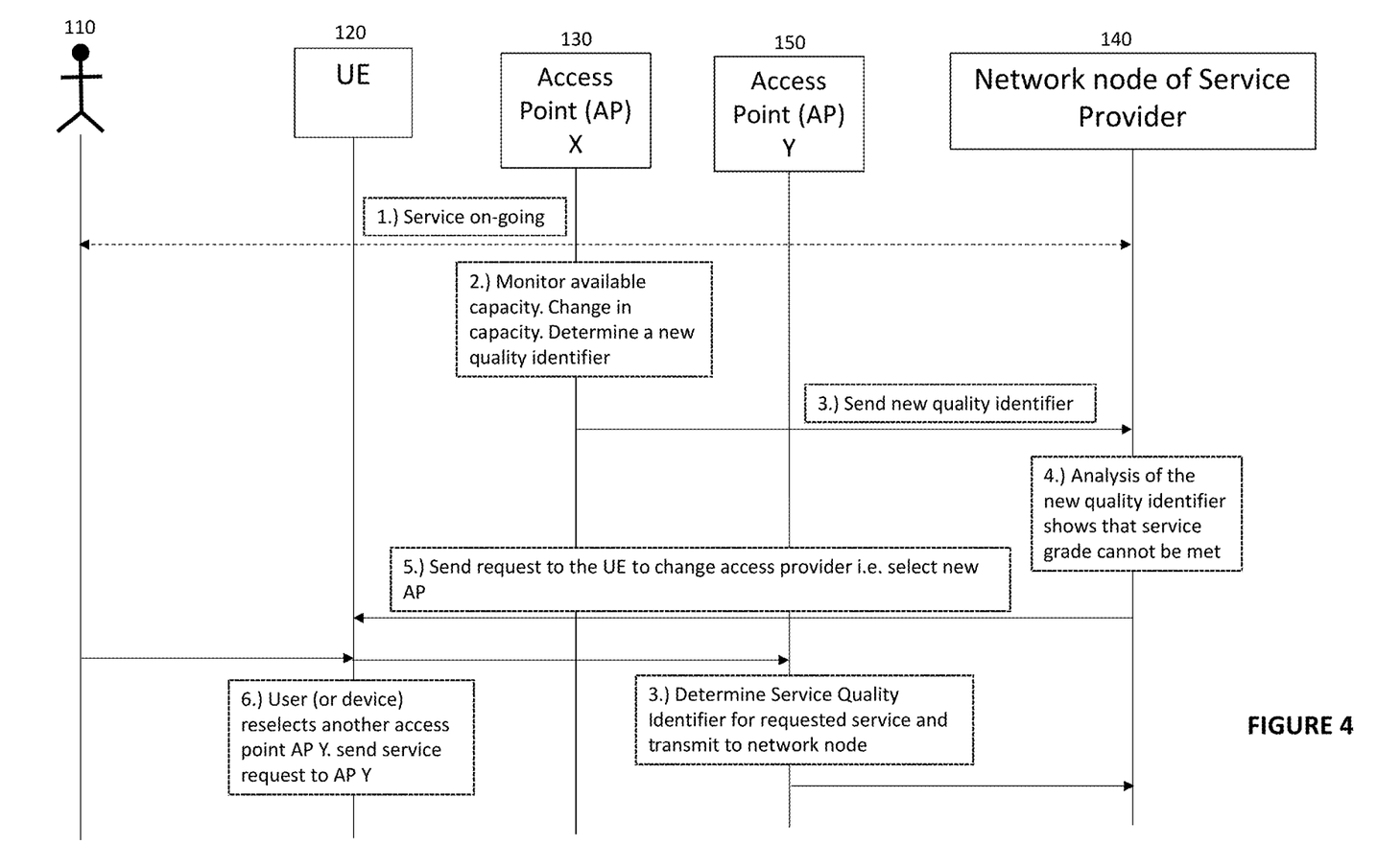
FIG. 4 illustrates a procedure involving two access points providing separate service quality identifiers to a service provider according to an example herein.

Referring to FIG. 4, there is illustrated a procedure involving two access points according to an example herein. Similarly to the scenario of FIG. 3, the service is established, i.e., on-going (1) and AP 130, also denoted AP X, monitors its available capacity (2) and determines that a change occurs in the available capacity. AP X 130 determines or calculates a new service quality identifier that can be offered. The new quality identifier is sent (3) to the network node 140 of the service provider. The network node 140 analyzes (4) the new quality identifier to check if the established service can still be offered to the user over AP 130.

In this case, the analysis shows that the service grade cannot be met i.e. the quality identifier is not enough for supporting the service. The network node 140 needs to inform the UE (or user) that a change of access network is necessary to continue to provide the service at a satisfactory level. Therefore, the network node 140 sends (5) a request to the user 110 or to the UE 120 to reselect a new access provider, i.e., a new AP. In this example, the new AP 150, denoted AP Y, is selected and a service request is sent (6) from the user 110 or the UE 120 to this new AP 150. Note that, the network node 140 may include, in the request to the UE 120, the name or SSID or HESSID of new AP Y 150. This could be the case if the network node 140 has previously included the name or SSID of new AP 150 in a list for the requested service. This process could also be automated to retry another AP.

When the new AP Y 150 receives the service request form UE 120, AP Y 150 determines a service quality identifier, as previously described, and sends the request including the service quality identifier to the network node 140. The network 140 analyzes the service quality identifier for determining whether or not the requested service can be supported over the new AP Y 150. That being the case, the network node 140 transmits a response to the user 110 or to the UE 120 informing that the service can be supported.

Figure 5:
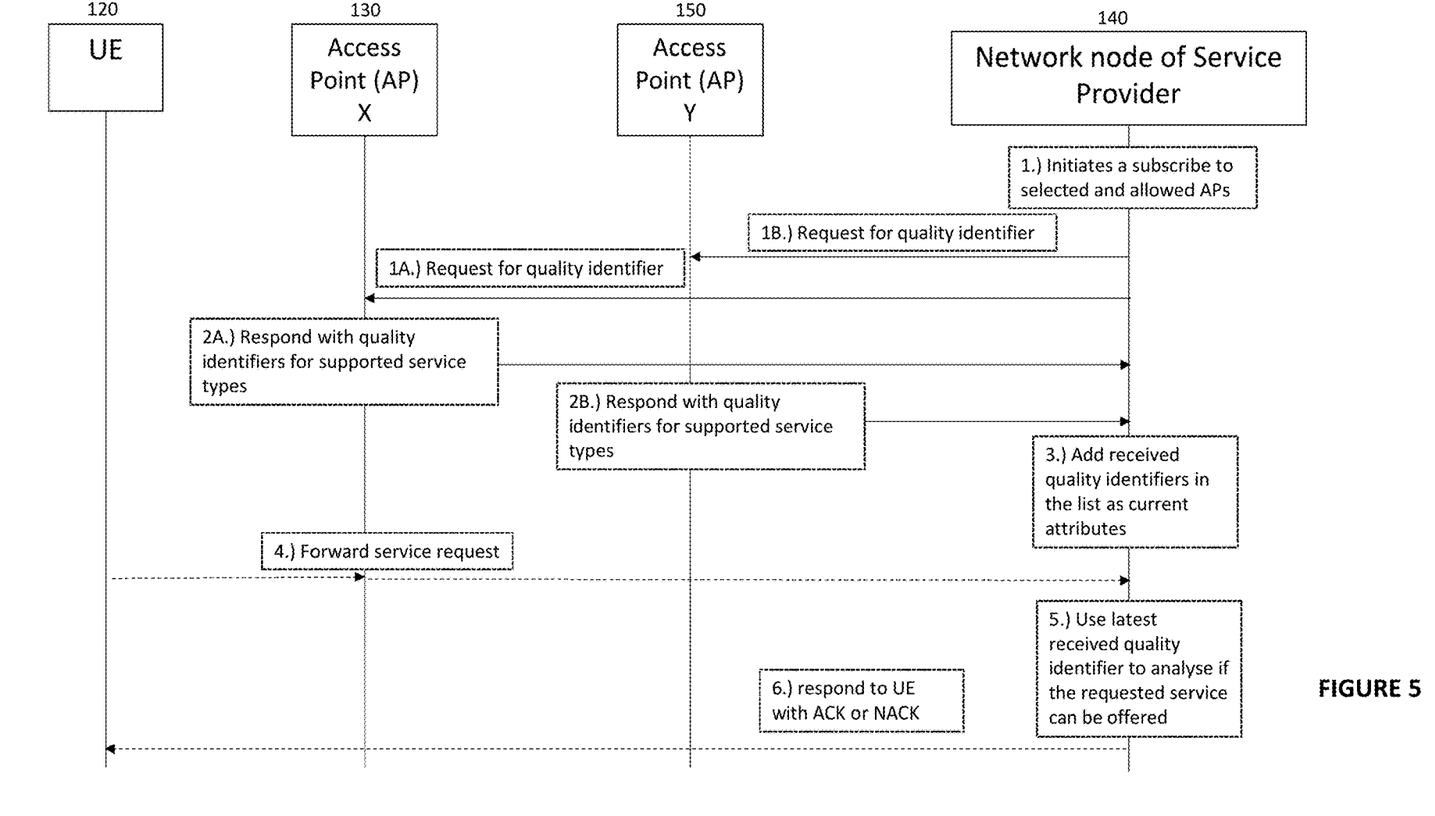
FIG. 5 illustrates a procedure involving two access points providing separate service quality identifiers to a service provider according to another example herein.

Referring to FIG. 5, there is depicted a procedure involving again two access points AP X 130 and AP Y 150, according to another example herein. In this scenario, the network node 140 has a list of allowed APs. The SSID (or HESSID) of AP X 130 and of AP Y 140 are here assumed included in the list of APs.

The network node 140 initiates (1) "a subscribe" to selected APs and sends to each AP, a request (1A, 1B) for the service quality identifier that can be offered by the respective AP. AP X 130 responds (2A) with current service quality identifiers for each supported service type. AP Y 150 also responds (2B) to the network node 140 with current network identifiers for supported service types. The network node 140 adds (3), for each AP specified in the list, respective service quality identifiers, received from each AP, as a current attribute. For an incoming service request from a UE that an AP, for some reason cannot analyze (due to, e.g., end-to-end encryption), the AP forwards (4) the service request to the network node 140. In this example, we assume that the UE 120 sends a service request to AP X 130 and AP X 130 forwards that request to the network node 140. The network node 140 can use the latest received quality identifier from AP X 130 to analyze and determine (5) if the requested service can be offered. The network node 140 then responds (6) to the UE 120 with a positive or negative acknowledgement (ACK/NACK) depending on the result of the analysis of the service quality identifier performed by the network node 140.

Figure 6:
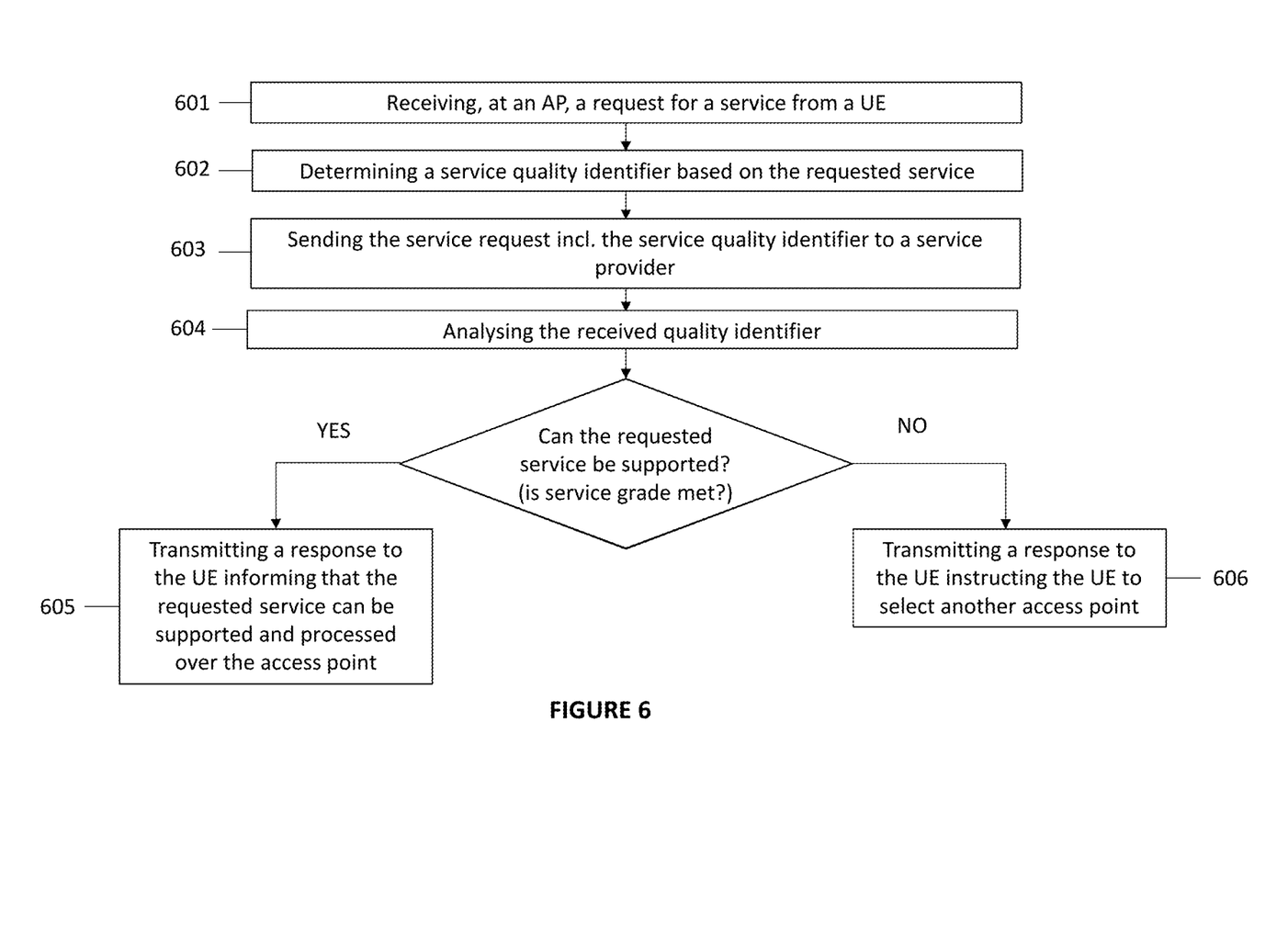
FIG. 6 illustrates a flowchart of a method performed in a network environment according to some embodiments herein.

Referring to FIG. 6 there is illustrated a flowchart of a method performed in a network for quality of service assessment, in accordance with previously described embodiments. The method comprises:
- (601) receiving, at an access point 130, a request for a service, form a UE 120;
- (602) determining, at the access point 130, a service quality identifier based on the requested service;
- (603) sending the service request including the determined service quality identifier, to a network node 140 of the service provider;
- (604) analyzing, by the network node 140, the received service quality identifier for determining whether or not the requested service can be supported by the access point 130 (or if the service grade is met);
- (605) if the requested service can be supported by the access point 130, transmitting a response to the UE 120 informing that the requested service can be supported over the access point 130;
- (606) if the requested service cannot be supported, transmitting a response to the UE 120, instructing the UE 120 to select another access point 150.

If the requested service can be supported over the access point 130, the method further comprises establishing a service connection between the UE 120 and the network node 140 for enabling the user 110 to start using or consuming the requested service. Assuming that the service is on-going between the user or the UE 120 and the network node 140 over the access point 130, the method also comprises monitoring available capacity of the access point 130 and if the available capacity changes, determining a new service quality identifier and sending the new service quality identifier to the network node 140. The same procedure is then performed by the network node 140, i.e., analyzing the new service quality identifier and determining if the service can still be supported by the access point 130 with the same service grade. That being the case, the service can continue and there is no need for the network node 140 to inform the user or UE 120 or the access point 130. The new quality identifier is also stored in the network node 140.

Figure 7:
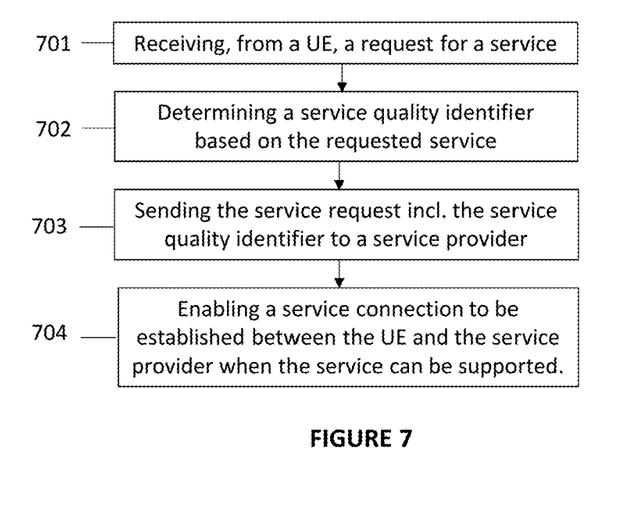
FIG. 7 illustrates a flowchart of a method performed in an access point according to some embodiments herein.

Referring to FIG. 7, there is illustrated a method performed by an AP 130 (or 150) for quality of service assessment, according to previously described embodiments. The method comprises:

(701) receiving, from a UE 120, a request for a service;
(702) determining a service quality identifier based on the requested service;
(703) sending the service request including the identifier to a network node 140 of a service provider; and
(704) enabling a service connection to be established between the UE 120 and the network node 140 of the service provider when the service can be supported over the access point, as decided by the network node 140.

Additional steps performed by the access point have already been described and do need to be repeated.

Figure 8:
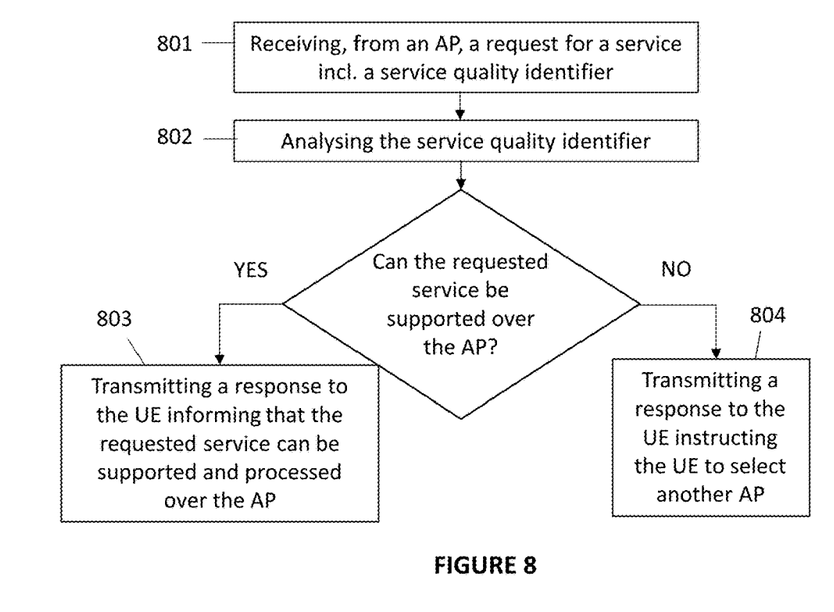
FIG. 8 illustrates a flowchart of a method performed in a network node of a service provider according to some embodiments herein.

Referring to FIG. 8, there is illustrated a method performed by a network node 140 of a service provider for quality of service assessment, according to previously described embodiments. The method comprises:
(801) receiving, from an AP 130, a request for a service including a service quality identifier;
(802) analyzing the service quality identifier;
(803) if the requested service can be supported, transmitting a response to the UE 120 informing the UE 120 that the service can be supported over the AP 130;
(804) if the requested service cannot be supported, transmitting a response to the UE 120 instructing the UE 120 to select another AP 150.

Additional steps performed by the network node 140 have already been described and need not be repeated.

Several advantages are achieved with the described embodiments. One is to provide the UE 120 the requested service with a reasonable quality of service. Another advantage is to allow the service provider to decide based on the service quality identifier, if the requested service can be delivered through the selected access point or if a new access network is to be chosen for the quality of service requirements to be met.

Figure 9:
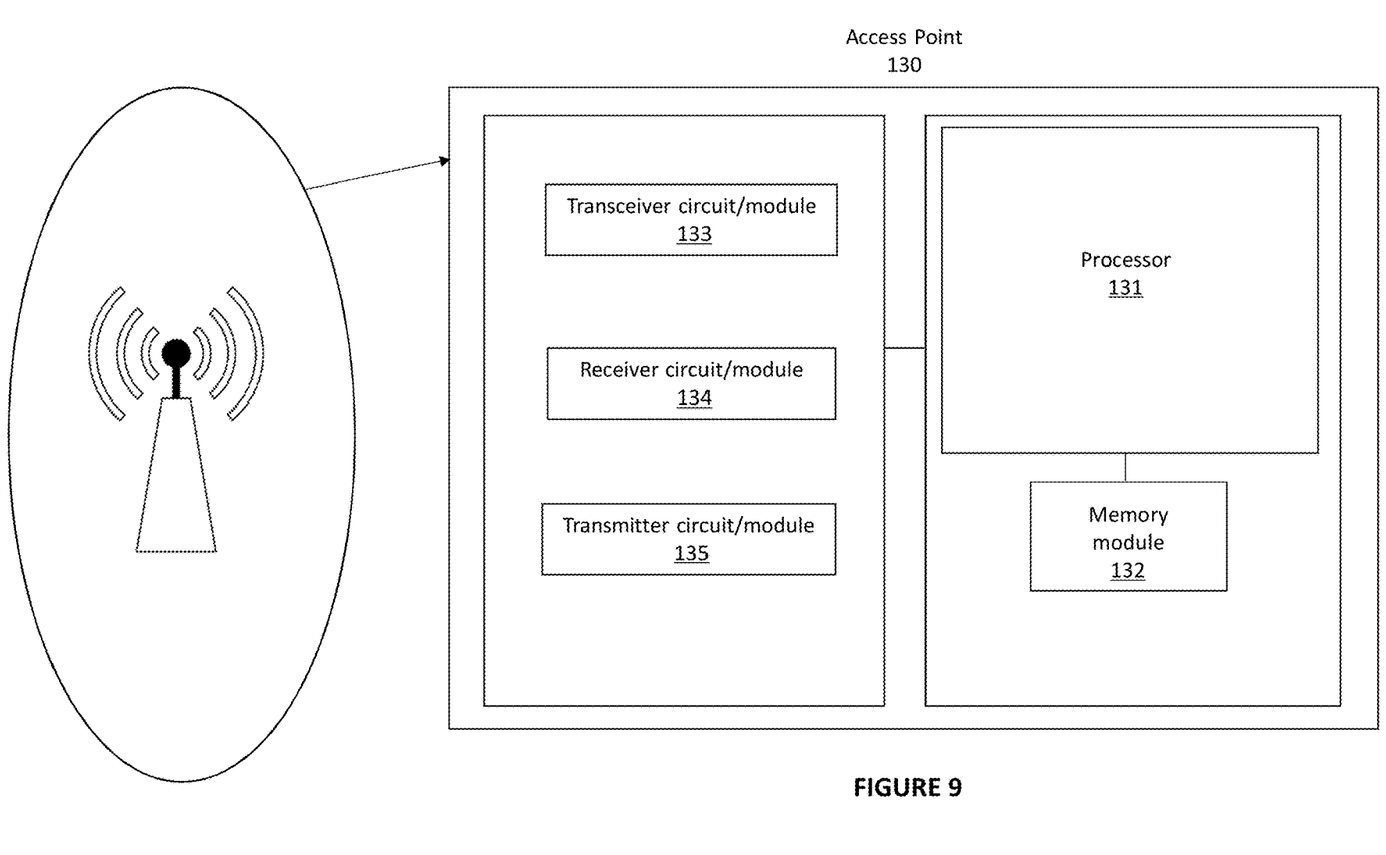
FIG. 9 illustrates a block diagram of an access point according to some embodiments herein.

The present disclosure also relates to an access point 130 to perform the method steps previously described in conjunction with FIG. 7. An exemplary block diagram of the access point or AP 130 is depicted in FIG. 9. The AP 130 can be any type of communication device capable in providing a service to a UE 120. The AP 130 comprises a processing circuitry or a processing module or a processor 131; a memory module 132; a receiver circuit or receiver module 134; a transmitter circuit or a transmitter module 135 and a transceiver circuit or a transceiver module 133 which may include transmitter circuit 135 and receiver circuit 134. The AP 130 supports WiFi radio access technology but may also support any other type of radio access technology including 2G, 3G, 4G, 5G, WiMAX or a combination thereof. The AP 130 may include any number of antennas.

The processing module/circuit 131 includes a processor, microprocessor, an application specific integrated circuit (ASIC), field programmable gate array (FPGA), or the like, and is referred to here as the "processor 131." The processor 131 controls the operation of the AP 130 and its components. Memory (circuit or module) 132 includes a random access memory (RAM), a read only memory (ROM), and/or another type of memory to store data and instructions that may be used by processor 131. In general, it will be understood that the AP device 130 in one or more embodiments includes fixed or programmed circuitry that is configured to carry out the operations in any of the embodiments disclosed herein.

The processor 131 is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory module 132 specially adapts or configures the processor 131 to carry out the operations of the AP 130 disclosed herein. Further, it will be appreciated that the AP 130 may comprise additional components not shown in FIG. 9.

The AP 130 by means of processor 131 is operative to receive, from a UE 120, a request for a service. The processor 131 is further operative to determine a service quality identifier based on the requested service and to send, to a network node of a service provider, the service request including the determined or calculated service quality identifier. The AP 130 is further operative to enable a service connection for the requested service to be established between the UE 120 and the (network node of) service provider when the requested service can be supported by the AP 130. It is however the network node 140 of the service provider that decides whether or not the requested service can be supported and delivered over the AP 130.

The AP 130 is also operative to monitor, during the on-going use of the requested service, available capacity and to determine or calculate a new service quality identifier for the same service if the available capacity changes. The AP 130 is further operative to send the new service quality identifier to the network node of the service provider. The service quality identifier may be determined by mapping the requirements of the requested service, in terms of at least: required bandwidth, latency and packet loss, to the available bandwidth, latency and packet loss that the AP 130 can support for the service and to further select a service quality identifier from a set of quality identifiers on the basis of said mapping. As previously explained, the service quality identifier may be a numeric value (e.g., 1-1000) that represents the ability of the AP 130 to offer and provide the service with a constant (good) quality. The quality identifier may be determined using an algorithm taking into consideration at least the requirements of the service. Additional parameters may also be included in the algorithm, e.g., the number of UEs 120 connected to an AP 130 at a certain time etc.

There is also provided a computer program comprising instructions which when executed on at least one processor 131 of the network node 130 according to embodiments herein, causes the processor 131 to carry out the method previously described. Also, a carrier containing the computer program is provided, wherein the carrier is one of a computer readable storage medium; an electronic signal, optical signal or a radio signal.

Figure 10:
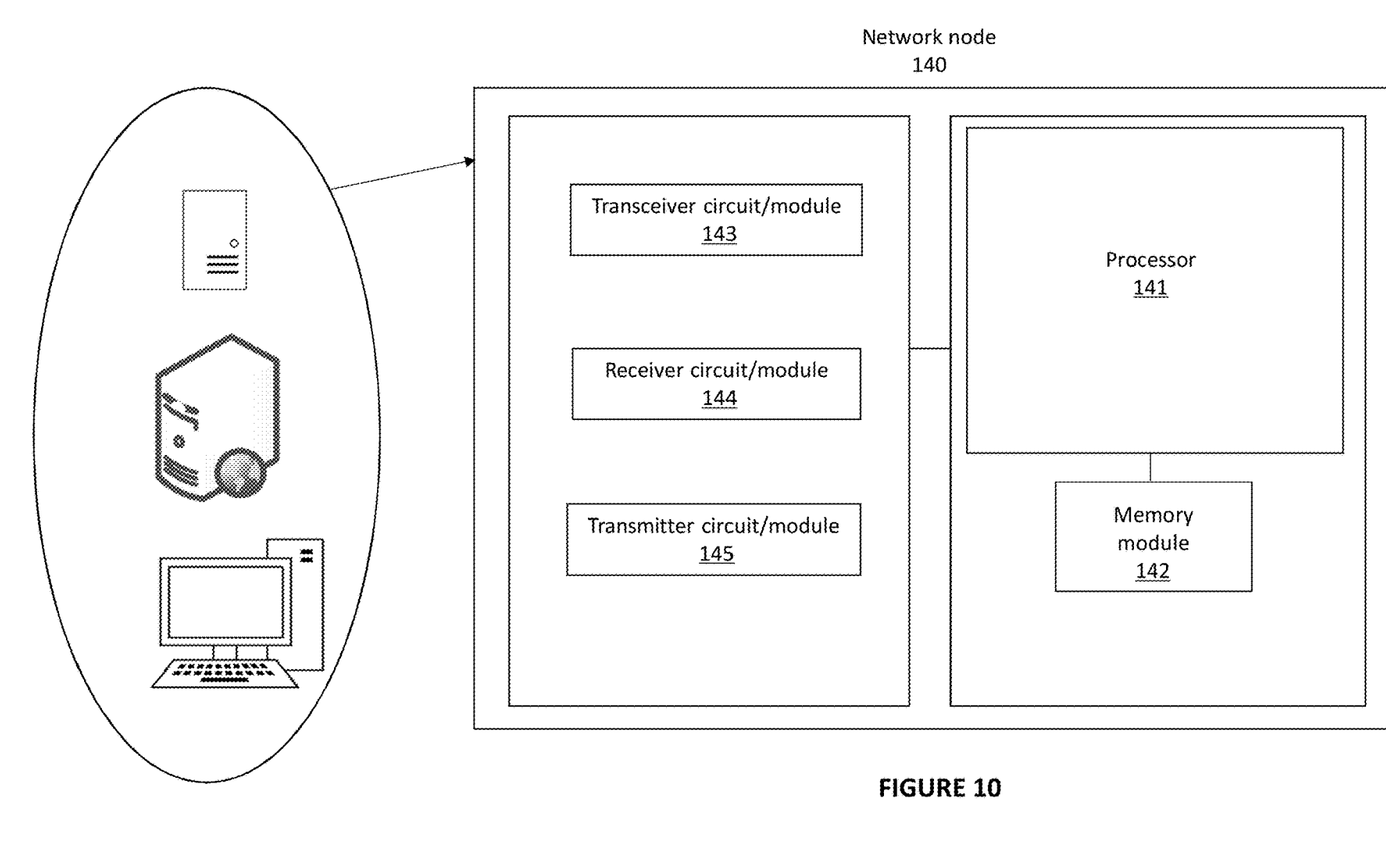
FIG. 10 illustrates a block diagram of a network node according to some embodiments herein.

The present disclosure also relates to a network node 140 of a service provider to perform the method steps previously described in conjunction with FIG. 8. An exemplary block diagram of the network node 140 is depicted in FIG. 10. Examples of a network node 140 are also depicted in FIG. 10, which may include an application server, a computer, a web server or any suitable network node for providing a requested service to a client device (e.g., the UE 120).

The network node 140 comprises a processing circuitry or a processing module or a processor 141; a memory module 142; a receiver circuit or receiver module 144; a transmitter circuit or a transmitter module 145 and a transceiver circuit or a transceiver module 143 which may include transmitter circuit 145 and receiver circuit 144.

The processing module/circuit 141 includes a processor, microprocessor, an application specific integrated circuit (ASIC), field programmable gate array (FPGA), or the like, and is referred to here as the "processor 141." The processor 141 controls the operation of the network node 140 and its components. Memory (circuit or module) 142 includes a random access memory (RAM), a read only memory (ROM), and/or another type of memory to store data and instructions that may be used by processor 141. In general, it will be understood that the network node 140 in one or more embodiments includes fixed or programmed circuitry that is configured to carry out the operations in any of the embodiments disclosed herein.

The network node 140 by means of processor 141 is operative to receive, from an AP, a service request including a service quality identifier; analyze the received service quality identifier for determining whether or not the requested service can be supported. If the requested service can be supported, the network node 140 is operative to transmit a response to a UE 120 (requesting the service) informing the UE 120 that the service can be supported over the AP. If the requested service cannot be supported, the network node 140 is operative to transmit a response to the UE 120 instructing the UE 120 to select another access point.

Assuming that the service can be supported over the AP, the network node 140 is configured to establish a service connection with the UE 120 for enabling the UE 120 to use the service. The network node 140 is further operative to receive a new service quality identifier from the AP if the available capacity of the AP changes for the on-going service. The network node 140 is further operative to maintain a list of AP identities (e.g., SSIDs and HESSIDs) and also a list of service quality identifiers provided by each AP identified in said list.

Additional functions of the network node 140 have already been described and need not be repeated.

There is also provided a computer program comprising instructions which when executed on processor 141 of the network node 140 according to embodiments herein, causes the processor 140 to carry out the method previously described. Also, a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, the embodiments herein may be applicable is any wired or wireless systems, including 2G, 3G, 4G, 5G, Wifi, WiMax etc.

The invention claimed is:

1. A method for quality of service assessment in a network, the method comprising:
   an access point receiving, from a user equipment, a request for a service;
   the access point determining a service quality identifier based on the requested service;
   the access point sending, to a network node of a service provider, the service request including the service quality identifier;
   the network node of the service provider analyzing the received service quality identifier for determining whether or not the requested service can be supported;
   if the requested service can be supported, transmitting a response to the user equipment informing that the service can be supported over the access point;
   if the requested service cannot be supported, transmitting a response to the user equipment instructing the user or the user equipment to select another access point;
   if the requested service can be supported over the access point, establishing a service connection with the network node over the access point to start at least one of using and consuming the requested service;
   monitoring, by the access point, its available capacity and determining a new service quality identifier if the available capacity changes;
   sending the new service quality identifier to the network node of the service provider;
   analyzing, by the network node of the service provider, the received new service quality identifier for determining whether or not the requested service can be supported; and
   if the network node determines that the requested service cannot be supported based upon the new service quality identifier,
   receiving, by the user equipment, from the network node, a request to reselect a new access point.

2. The method according to claim 1 further comprising:
   storing the new quality service identifier if the requested service can be supported based on analysis of the new quality service identifier.

3. The method according to claim 1, wherein determining the service quality identifier comprises:
   mapping requirements of the requested service in terms of at least one of required bandwidth, latency and packet loss, to the available bandwidth, latency and packet loss that the access point can support for the requested service; and
   selecting a service quality identifier from a set of service quality identifiers on the basis of said mapping.

4. The method according to claim 1, wherein the network node of the service provider maintains a list of access point identities and a list of service quality identifiers, wherein each service quality identifier is received from an access point identified in said list of access point identities.

5. The method of claim 1, wherein the service quality identifier is a weighted number that represents a quality value to be met for the requested service.

6. An access point for quality of service assessment in a network, the access point comprising a processor and a memory containing instructions executable by the processor whereby the access point is operative to:
   receive, from a user equipment, UE, a request for a service;
   determine a service quality identifier based on the requested service;
   send, to a network node of a service provider, the service request including the service quality identifier for analysis; and
   enable a service connection for the requested service to be established between the UE and the service provider when the requested service can be supported by the access point;
   if the requested service can be supported over the access point, establish a service connection with the network node over the access point to start at least one of using and consuming the requested service;
   monitor, by the access point, its available capacity and determining a new service quality identifier if the available capacity changes;
   send the new service quality identifier to the network node of the service provider;

analyze, by the network node of the service provider, the received new service quality identifier for determining whether or not the requested service can be supported; and if the network node determines that the requested service cannot be supported based upon the new service quality identifier, receive, by the user equipment, from the network node, a request to reselect a new access point.

7. The access point according to claim 6, wherein the access point is further operative to determine the service quality identifier by mapping requirements of the requested service in terms of at least: one of required bandwidth, latency and packet loss to the available bandwidth, latency and packet loss that the access point can support for the requested service, and to select a service quality identifier from a set of service quality of identifiers on the basis of said mapping.

8. A method performed by an access point for quality of service assessment in a network, the method comprising:

receiving, from a user equipment, UE, a request for a service;

determining a service quality identifier based on the requested service;

sending, to a network node of a service provider, the service request including the service quality identifier for analysis;

enabling a service connection for the requested service to be established between the UE and the service provider when the requested service can be supported by the access point;

if the requested service can be supported over the access point, establishing a service connection with the network node over the access point to start at least one of using and consuming the requested service;

monitoring, by the access point, its available capacity and determining a new service quality identifier if the available capacity changes;

sending the new service quality identifier to the network node of the service provider;

analyzing, by the network node of the service provider, the received new service quality identifier for determining whether or not the requested service can be supported; and if the network node determines that the requested service cannot be supported based upon the new service quality identifier, receiving, by the user equipment, from the network node, a request to reselect a new access point.

9. The method according to claim 8, further comprising:

determining the service quality identifier by mapping requirements of the requested service in terms of at least one of required bandwidth, latency and packet loss to the available bandwidth, latency and packet loss that the access point can support for the requested service; and selecting a service quality identifier from a set of service quality of identifiers on the basis of said mapping.

10. A network node of a service provider for quality of service assessment in a network, the network node comprises a processor and a memory containing instructions executable by the processor whereby the network node is operative to:

receive, from an access point, a service request including a service quality identifier for the requested service;

analyze the received service quality identifier for determining whether or not the requested service can be supported;

if the requested service can be supported, transmit a response to a user equipment, UE, informing the UE that the service can be supported over the access point;

if the requested service cannot be supported, transmit a response to the UE instructing the UE to select another access point;

receive a new service quality identifier if the available capacity of the access point changes for the requested service, the access point monitoring its available capacity and determining the new service quality identifier if the available capacity changes;

analyze the received new service quality identifier for determining whether or not the requested service can be supported; and if the network node determines that the requested service cannot be supported based upon the new service quality identifier, send, to the user equipment, a request to reselect a new access point.

11. The network node according to claim 10, wherein the network node is further operative to establish a service connection with the UE over the access point for the requested service if the requested service can be supported by the access point.

12. The network node according to 10, wherein the network node is operative to maintain a list of access point identities and a list of service quality identifiers, wherein each service quality identifier is received from an access point identified in said list of access point identities.

13. A method performed by a network node of a service provider for quality of service assessment in a network, the method comprising:

receiving, from an access point, a service request including a service quality identifier for the requested service;

analyzing the received service quality identifier for determining whether or not the requested service can be supported;

if the requested service can be supported, transmitting a response to a user equipment, UE, informing the UE that the service can be supported over the access point;

if the requested service cannot be supported, transmitting a response to the UE instructing the UE to select another access point;

receiving a new service quality identifier if the available capacity of the access point changes for the requested service, the access point monitoring its available capacity and determining the new service quality identifier if the available capacity changes;

analyzing the received new service quality identifier for determining whether or not the requested service can be supported; and if the network node determines that the requested service cannot be supported based upon the new service quality identifier, sending, to the user equipment, a request to reselect a new access point.

14. The method according to claim 13, further comprising establishing a service connection with the UE over the access point for the requested service if the requested service can be supported by the access point.

15. The method according to claim 13, further comprising maintaining a list of access point identities and a list of service quality identifiers, wherein each service quality identifier is received from an access point identified in said list of access point identities.

\* \* \* \* \*